United States Patent [19]
Afshari

[11] Patent Number: 5,828,502
[45] Date of Patent: Oct. 27, 1998

[54] OPTICAL BENCH SYSTEM

[76] Inventor: Ali Afshari, c/o AF optical Company, 17962 Sky Park Cir., Suite A., Irvine, Calif. 92714

[21] Appl. No.: 793,305
[22] PCT Filed: Sep. 26, 1994
[86] PCT No.: PCT/US94/11472
   § 371 Date: Mar. 14, 1997
   § 102(e) Date: Mar. 14, 1997
[87] PCT Pub. No.: WO96/10204
   PCT Pub. Date: Apr. 4, 1996
[51] Int. Cl.[6] ......................................... G02B 7/02
[52] U.S. Cl. .......................... 359/819; 359/822; 359/823; 211/41.1
[58] Field of Search ...................... 359/811, 819, 359/822, 823, 826; 606/166; 250/576; 211/41.1

[56] References Cited

U.S. PATENT DOCUMENTS

| | | |
|---|---|---|
| 2,826,333 | 3/1958 | Rodemich . |
| 3,113,363 | 12/1963 | Fyvie . |
| 3,539,874 | 11/1970 | Swanson . |
| 3,856,472 | 12/1974 | Schweitzer et al. . |
| 3,875,711 | 4/1975 | Palmer . |
| 3,889,815 | 6/1975 | Merle . |
| 3,896,743 | 7/1975 | Pariente . |
| 3,941,273 | 3/1976 | Dalencon . |
| 4,088,396 | 5/1978 | Edelstein ................ 359/822 |
| 4,093,076 | 6/1978 | Newton . |
| 4,234,094 | 11/1980 | Jorgensen . |
| 4,796,252 | 1/1989 | Maan ..................... 369/112 |
| 5,035,333 | 7/1991 | Klinger ................... 211/41.1 |
| 5,138,496 | 8/1992 | Pong ...................... 359/822 |
| 5,166,829 | 11/1992 | Tizuka .................... 359/823 |
| 5,461,444 | 10/1995 | Okura et al. ............. 359/819 |
| 5,546,238 | 8/1996 | Devenyi .................. 359/823 |
| 5,636,062 | 6/1997 | Okuyama et al. ........ 359/823 |
| 5,644,440 | 7/1997 | Akada .................... 359/823 |

FOREIGN PATENT DOCUMENTS

| | | |
|---|---|---|
| 2456500 | 6/1975 | Germany . |
| 2636657 | 2/1978 | Germany . |
| 340675 | 8/1957 | Sweden . |
| 465328 | 4/1967 | Sweden . |

*Primary Examiner*—Loha Ben
*Attorney, Agent, or Firm*—Paul H. Ware

[57] ABSTRACT

An optical bench system that provides a plurality of optical components that may be assembled so as to construct a multiplicity of optical instruments in many varied configurations. Varied, non-rectangular optical mounting plates facilitate manipulation of the optical axis in a given system so as to reach a desired resulting optical instrument. Structural members provide stability and facilitate connectability.

21 Claims, 14 Drawing Sheets

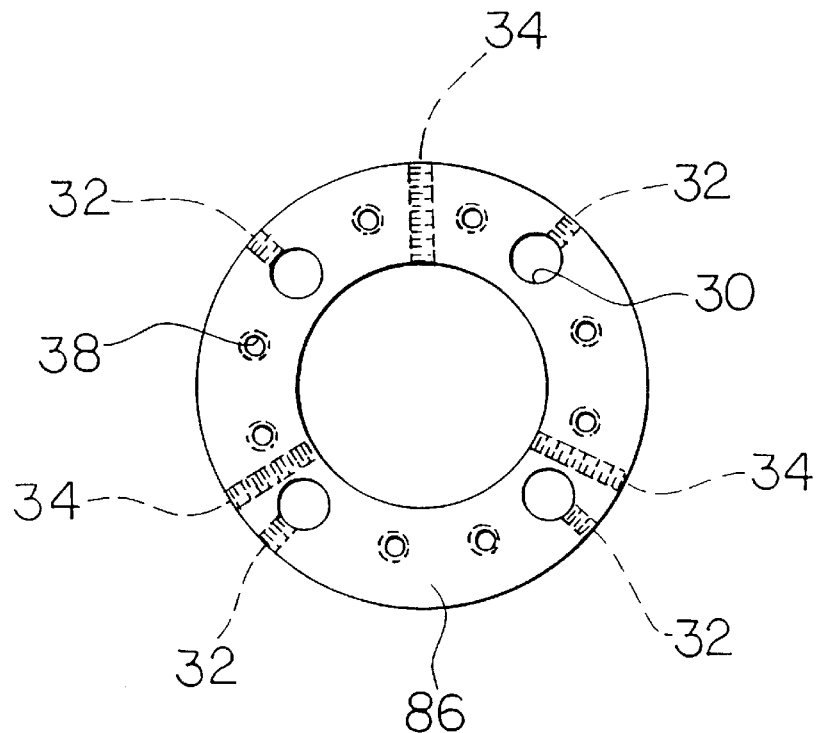
FIG.14
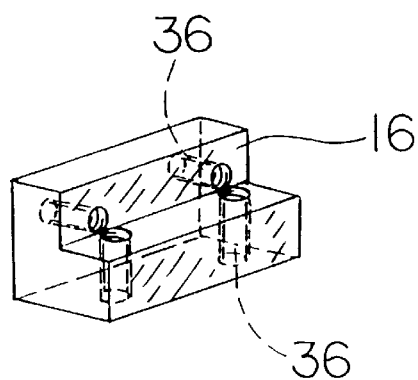     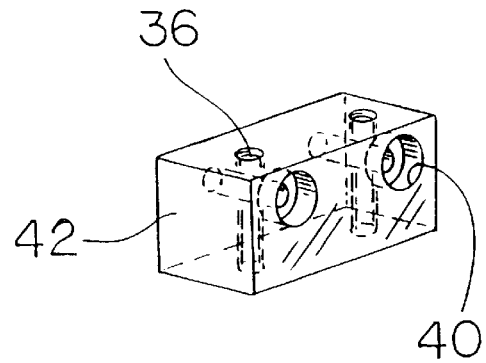
FIG.15     FIG.16

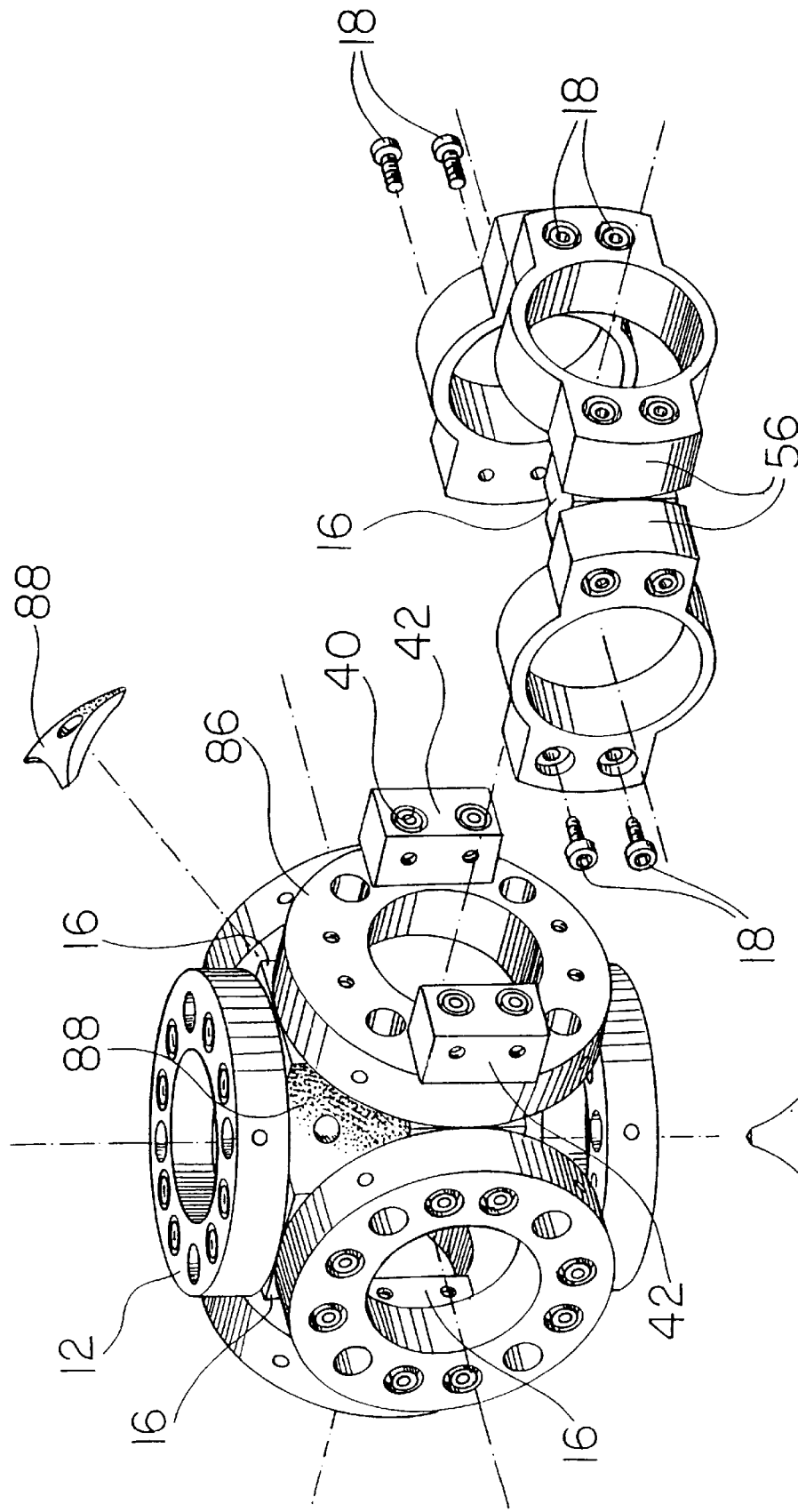

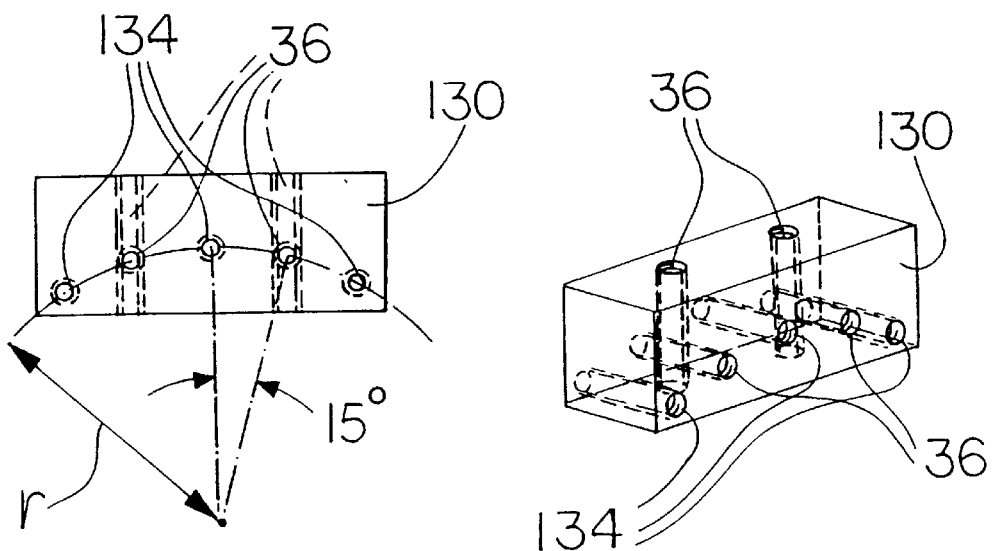
FIG.18  FIG.19
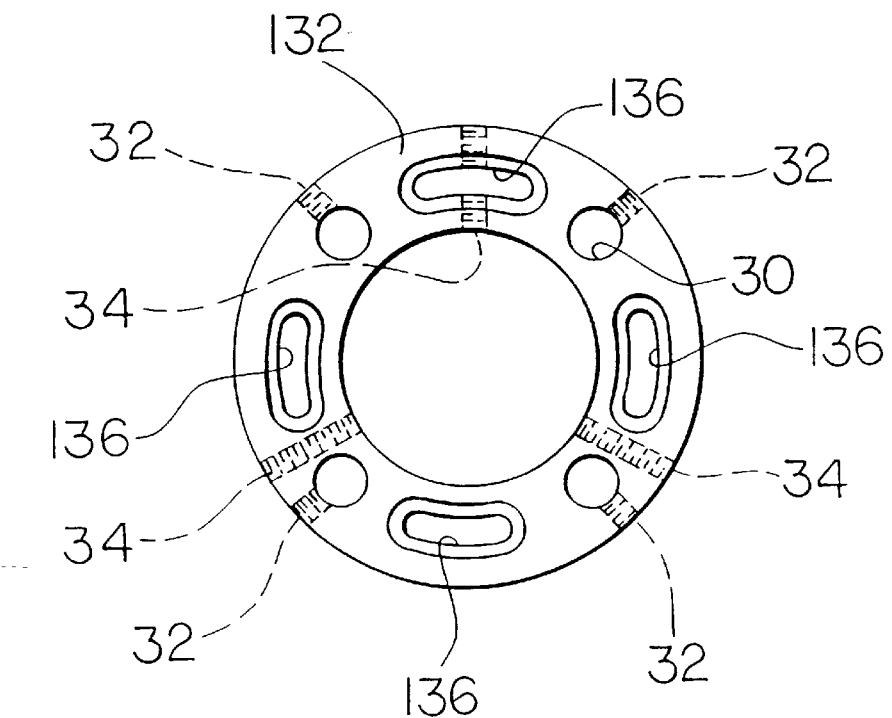
FIG.20

OPTICAL BENCH SYSTEM

TECHNICAL FIELD

This invention relates to optical bench system sets and includes a plurality of optical bench components in each set that may be used together to construct a multiplicity of optical instruments.

BACKGROUND ART

Of interest in the prior art is the German Offenlegungsschrift 26 36 657. Its elements include optical mounts which are implemented as square plates having perforations through which rods may extend at each corner. The optical mounts provide a relatively large opening in which optical elements such as lenses, mirrors, gratings and the like can be positioned at the center thereof. Pins are provided for the purpose of securing the optical mounts to the rods at selected positions. The plates are clamped together at right angles by means of corner connectors and separate pins. Although this apparatus and method for assembly is effective for rough, temporary set-up, sufficient rigidity is not maintained for precise optical alignment and additionally, the square shape of the plates limits the number of configurations in which the plates may be assembled.

The prior art also includes U.S. Pat. No. 5,035,333 to Hartmut Klingner for ARRANGEMENT FOR CONSTRUCTING A MICRO-OPTIC BENCH issued Jul. 30, 1991, and reference patents and documents cited therein. The device described in the Klingner patent provides mounts for holding optical elements that preferably are manufactured out of injection-molded plastic. It appears that this technique has been employed in order to provide an elastic snap-together feature between the rods and the optical mounts. The perforations through the mounts have elevations that have been called knobs or ribs distributed along their circumferences in order to establish this snap-together fastening facility. Although this system does not require set screws and is inexpensive to manufacture, it must be fabricated out of plastic and it does not offer any solution for mounting the plates together.

Of lesser import but still of interest are two Swiss patents numbered 340675 and 465238 provided herewith as being of interest in the general field.

In the prior art, the square shape of the optical mounting plates limits the angles at which the plates can be mounted together. Plates are conventionally fastened together by means of screws, therefore, all four sides of the plates have to be provided with some threaded bores, whether the bores are used in every assembly or not. Further, the plates are joined together by corner connectors which must have equal numbers of bores through which the screws are secured. The plates are, therefore, highly labor intensive to produce. With the square shape, optical components must be held at four points since the retaining screws must be placed at each side of the plate. Three-point positional adjustment is more advantageous while at the same time allowing easier removal of the optical component. It should also be again especially noted that square plates are much more labor-intensive to manufacture than round plates. Square plates must be machined at four sides in order to achieve precise right angles at all corners whereas the machining of round plates only requires a simple lathe operation.

The prior art devices presented, including those cited in the Klingner patent, are commendable and show a creative spirit for their times. The inventors and their inventions have contributed remarkably to the technology involved. However, these prior art structures do not include those combined elements of the instant invention that provide greater facility of use and ingenious arrangement of components and that make the instant invention the high culmination in the art.

DISCLOSURE OF INVENTION

Components in the field of optics are usually manufactured to strict tolerances and meticulously positioned by means of precision threads and screws. These optical components must, in certain applications, operate with high precision, thus justifying the high fabrication costs that prohibit these devices from being used in applications in which less accuracy is required. The present invention is intended as a development of an arrangement or optical system set that can be assembled as a high precision optical bench with maximum flexibility. Through the advantages of the invention, it will be possible to construct a much wider range of optical setups than is possible with the use of conventional square plates. The openings in the plates are symmetrically spaced apart so as to allow the plates to be mounted together at different angles with small increments and actually at any angle using separate plates with slight modification. Thus the system set can be employed in any application where high precision is a prerequisite and can be utilized in combinations with conventional optical elements.

In accordance with the instant invention, optical mounting plates are provided by means of which a multiplicity of optical experiments and configurations may be assembled, verified and tested and otherwise examined at the pleasure of a user. A significant feature of the present invention is the non-rectangular aspect of the optical mounting plates. Greater precision and accuracy in adjustment and near continuous vis-a-vis discrete variations in optical alignment and positioning have been provided. More economical fabrication costs and greater flexibility are achieved in accordance with the invention by the provision of unthreaded, radially positioned openings in the mounting plates and providing threaded bores on the corner connectors instead thus effectively reducing the costs of the mounting sets. Where high precision is not required, because the openings in the plates are not threaded, the plates can be made out of plastic thereby making them even less expensive to manufacture.

BRIEF DESCRIPTION OF DRAWINGS

Further advantages and features of the instant invention will be more fully apparent to those skilled in the art to which the invention pertains from the ensuing detailed description thereof, regarded in conjunction with the accompanying drawings wherein like reference numerals refer to like parts throughout and in which:

FIG. 14 is a plan view in cross section of another optical mounting plate in accordance with the invention.

FIG. 15 is a perspective view of a corner connector.

FIG. 16 is a perspective view of a corner connector different from that shown in FIG. 15.

FIG. 17 is a perspective view exemplifying the assembly of full or half cubes through the utilization of various plates and corner connectors and including a light shield.

FIG. 18 is a plan view of a corner connector showing radially positioned bores for use in positioning elements.

FIG. 19 is a perspective view of the corner connector of FIG. 18 with the bores shown in phantom.

FIG. 20 is a view of an optical mount in accordance with the invention.

FIG. 24 is a perspective view showing how the optical element shown in FIG. 23 may be utilized in the configuration of special optical cubes and the like.

BEST MODE FOR CARRYING OUT THE INVENTION

Figure 1:
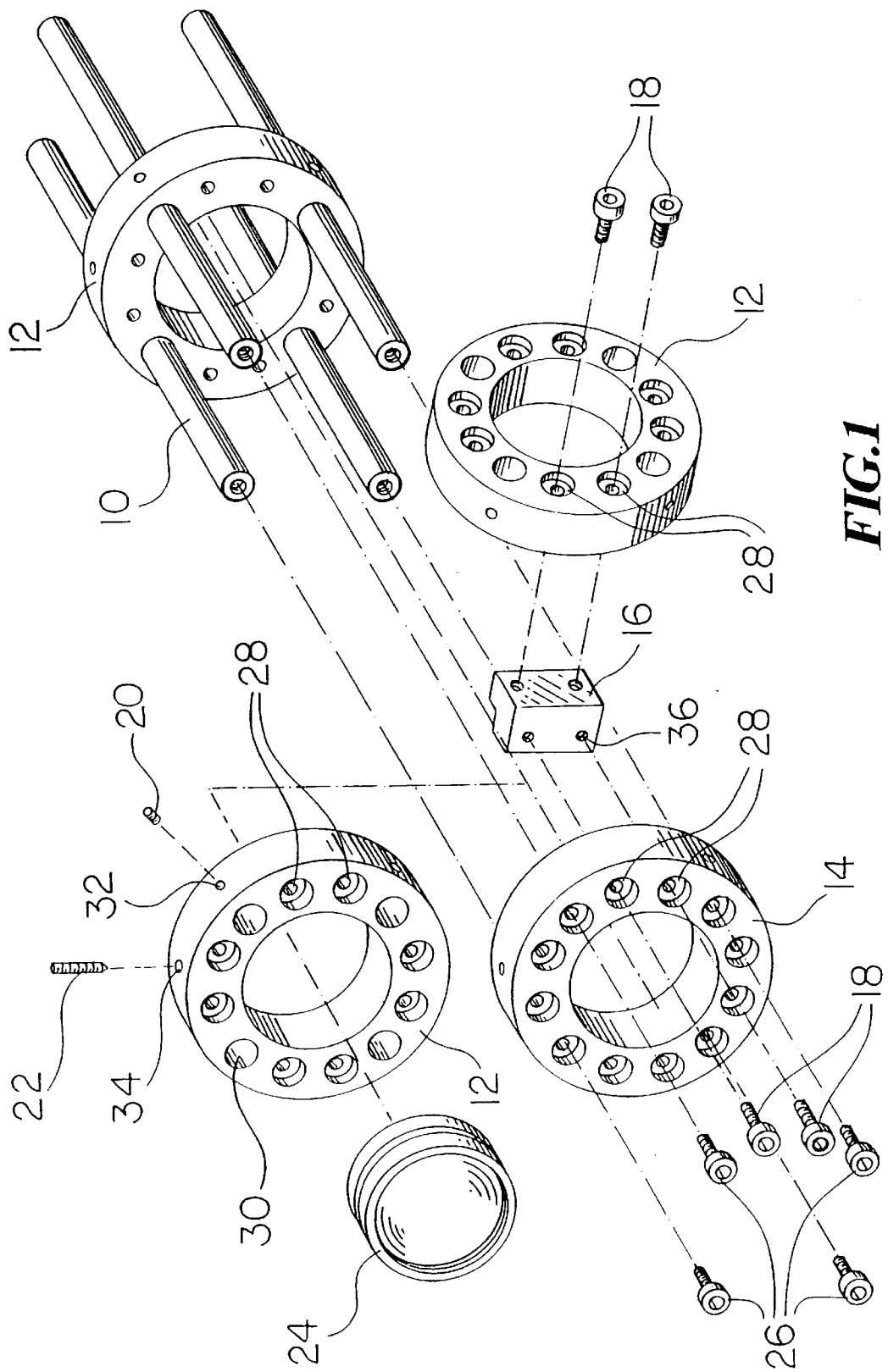
FIG. 1 is an exploded perspective view of an assembly in accordance with the invention.

Although specific embodiments of the invention will now be described with reference to the drawings, it should be understood that such embodiments are by way of example only and merely illustrative of but a small number of the many possible specific embodiments which can represent applications of the principles of the invention. Various changes and modifications, obvious to one skilled in the art to which the invention pertains, are deemed to be within the spirit, scope and contemplation of the invention as further defined in the appended claims.

Referring to the drawing and to FIGS. 1 through 11 and 14 and 20 with greater particularity, optical mounting plate components of the Optical Bench System have been depicted.

Particularly noting FIG. 1 at this time, an exploded view of a typical configuration showing how a first generally truncated, circular cylindrical optical mounting plate 12, having a plate thickness dimension such that threaded bores may be fabricated therein in a radial direction and having axially directed rod accepting apertures or passages 30 and plate retaining rods 10 fed therethrough, may be fashioned. A corner connector 16, having third threaded bores or apertures 36 may connect another optical mounting plate 12 to a second generally truncated cylindrical optical mounting plate 14 by means of fastening screws 18 and counter-bored apertures 28 adapted to accept said screws. Rods 10 have been shown as threaded at the ends thereof so as to be secured to plate 14 by means of a second set of fastening screws 26. A first set of set screws 20 along with first threaded apertures or bores 32, adapted to accept said set screws, may be used to secure the positions of plates 12 along rods 10. A typical optical component 24 may be mounted and secured within the concentric central bore of an optical mounting plate by means of a second set of set screws 22 along with second threaded apertures or bores 34. In greater particularity, FIG. 1 shows how three fundamental arrangements of the optical mounting plates may be assembled in accordance with the invention. In a first configuration, a plurality of mounts 12 can be slid onto rods 10 and locked into position by means of set screws 20. Thus any of the plates so assembled can be securely positioned at any point along the rods. In a second configuration, a mount such as 14 can be fastened to the threaded ends of the rods 10 by means of the screws 26, therefore, mounts such as 14 may be fixed at either ends of the rods so that the rods may be fastened to any of the holes 28 around the mount. In a third construction, any two mounts may be secured together at right angles with a corner connector 16 which has threaded bores 36. Screws 18 secure the mounts to the corner connector 16 through the holes 28. By replication of this assembly procedure at the sides of each plate, an entire optical cube or even multiple cubes can be constructed as has been shown in FIG. 17. A simple optical element 24 may be secured in the mount by set screws 22 in threaded bores 34 and positioned so as to allow a user to center the optical element 24.

Figure 2:
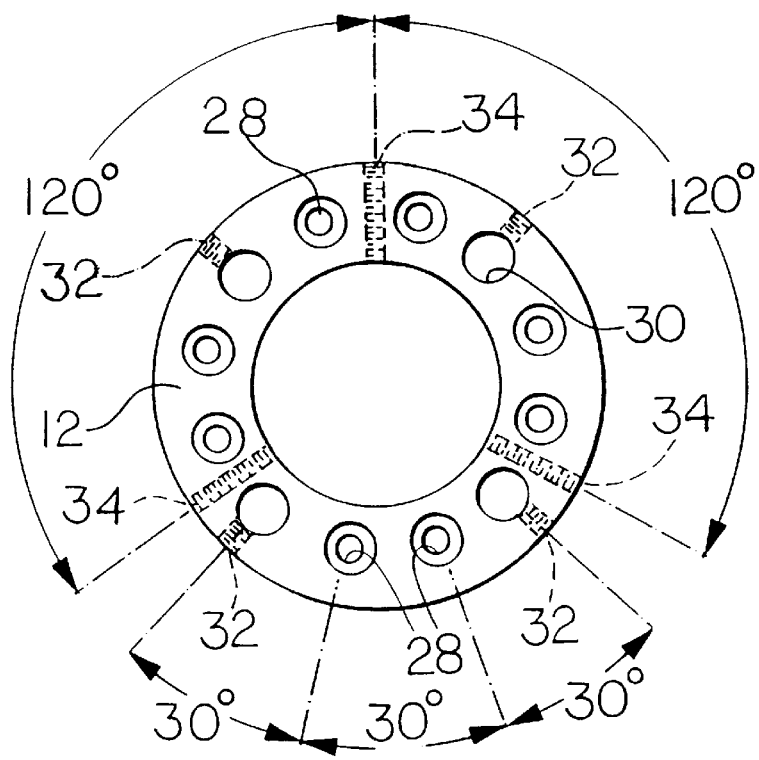
FIG. 2 is a detail plan view in cross section of a typical specification of an optical mounting plate.
Figure 3:
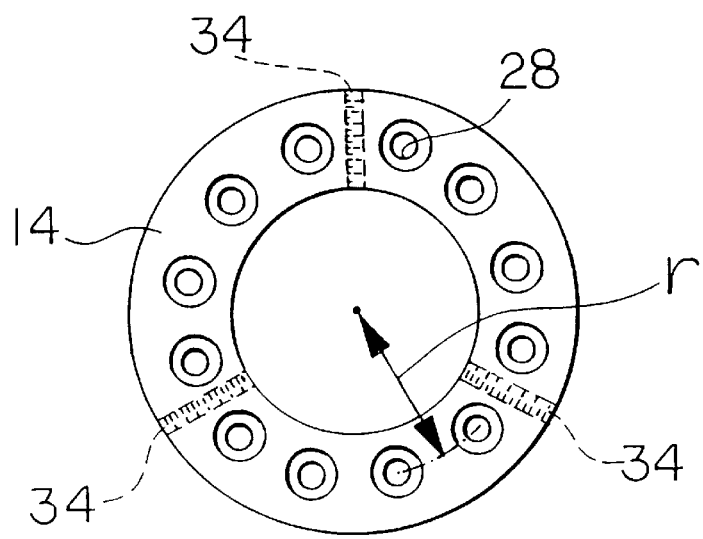
FIG. 3 is another detail plan view in cross section of a different optical mounting plate.
Figure 21:
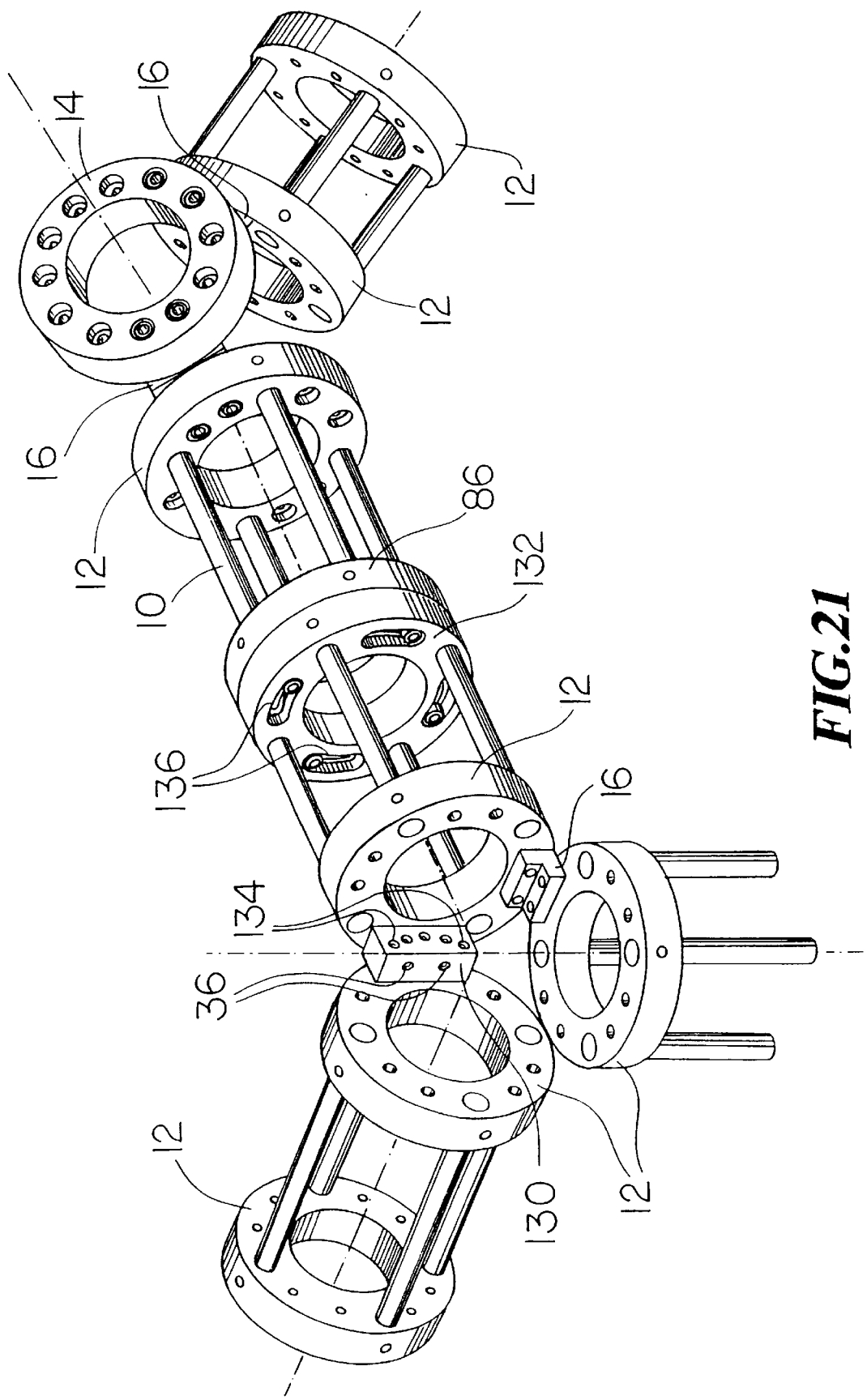
FIG. 21 is a perspective view of an assembly showing the use of the corner connector of FIGS. 18 and 19.

FIG. 2 is a detail drawing showing a typical specification of an optical plate 12 in a set such as is described in FIG. 1 and FIG. 3 shows a like detail of an optical plate 14 such as has been shown in FIG. 1. The cross-sectional aspect illustrated in both FIGS. 2 and 3, shows an outer radius and a concentric central bore adapted for the mounting of optical elements, and defining a differential radial dimension having holes bored therein. The holes 28 and 30 are positioned in thirty degree increments around the mount and in a set, their distance to the center is a fixed radial value r (FIG. 3). Mount 14 may be used to carry an optical element or it might be used as an intermediate plate with corner connectors to bend the optical axis of a system in predetermined angular increments as illustrated in FIG. 21. The typical detailed illustrations shown in FIGS. 2 and 3 are presented for illustrative purposes only and are not intended to limit the scope, spirit and contemplation of the invention.

Figure 4:
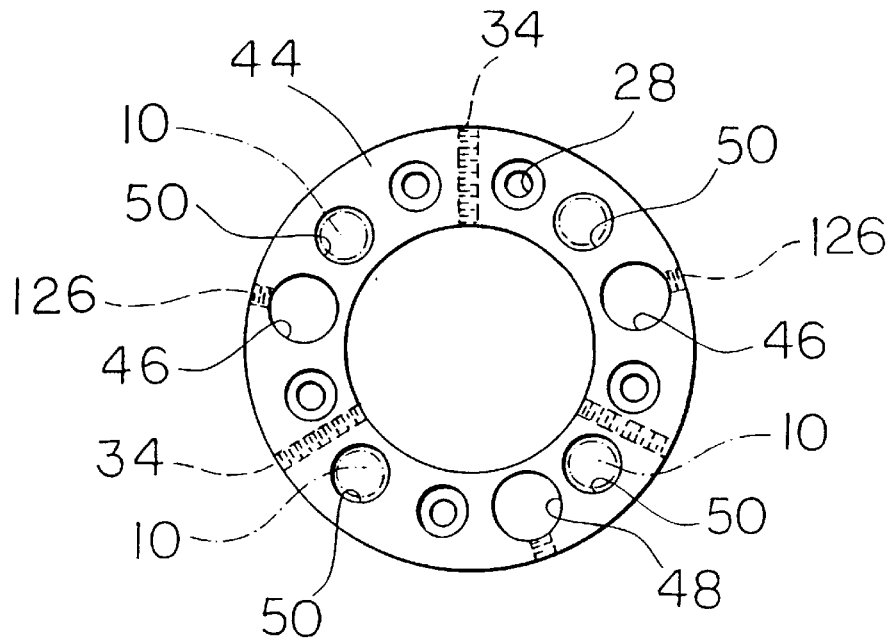
FIG. 4 is a plan view in cross section of yet another optical mounting plate.
Figure 12:
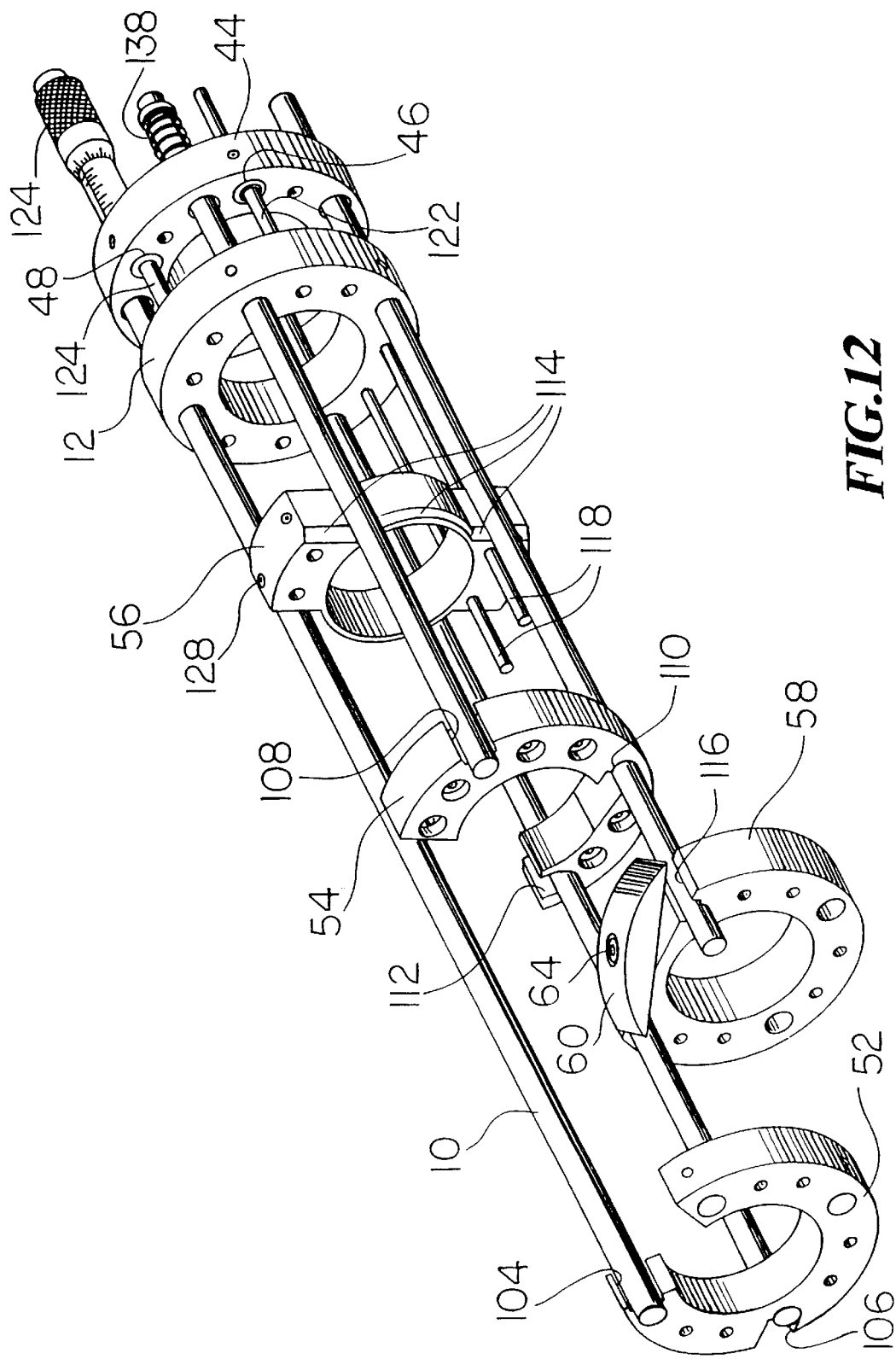
FIG. 12 is a perspective view exemplifying a typical assembly of various optical mounting plates.

FIG. 4 shows mount 44 having spaced, enlarged holes or apertures 50, operative to isolate the mount from physical contact with rods 10. This mount 44 is intended to be used in conjunction with ball-bearing guides fastened to holes 46 by means of set screws in threaded bores 126. When used in a four-rod arrangement as shown at FIG. 12, mount 44 rides on bearings 122 for a smooth axial movement so as to provide focusing or any other functions requiring precisely controlled movement in the direction of the rods. Fine positional adjustments can be achieved by a fine adjustment screw micrometer 124 shown as fastened at 48 (FIGS. 4 and 12) and used in conjunction with micrometer push return spring 138. When turned in one direction, say clockwise, the tip of this micrometer screw forces against mount 12 causing mount 44 to move in a first direction, i.e., to the right, when turned in the opposite direction, mount 44 moves in the opposite direction under the action of micrometer push return spring 138.

Figure 5:
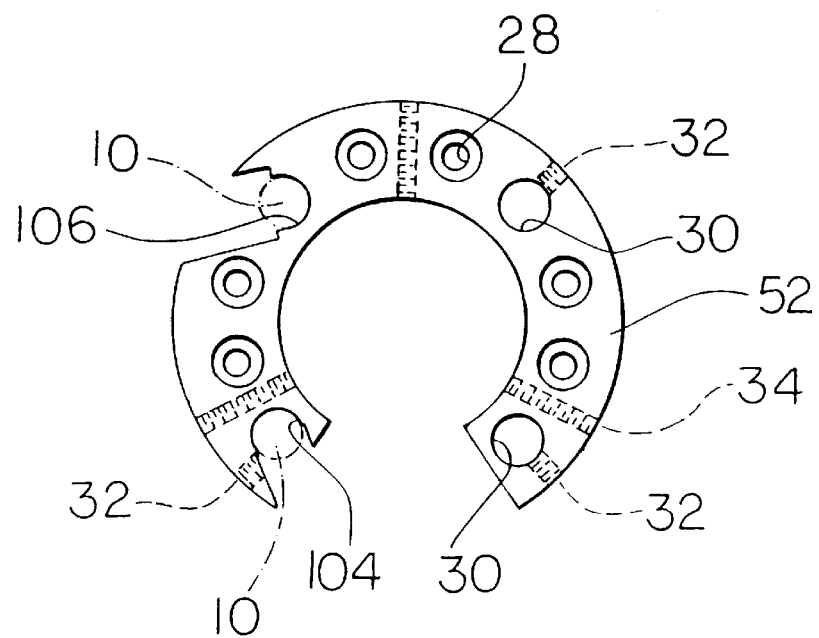
FIG. 5 is a plan view in cross section of a specially modified optical mounting plate.

FIG. 5 shows a mount 52 which is adapted to be easily inserted into or removed from an assembly having only two rods 10. At FIG. 12, the mount 52 is shown so attached. First insertable opening 104 in optical mount 52 is initially inserted on the top rod 10 and then the mount is rotated clockwise until second insertable opening 106 in optical mount 52 sits on the other rod 10. Mount 52 is then locked into position using a set screw in threaded bore 32 (FIG. 5) near opening 104. Mount 52 additionally affords easy insertion and removal of optical components as a concomitant of the discontinuity or gap in its circumference.

Figure 6:
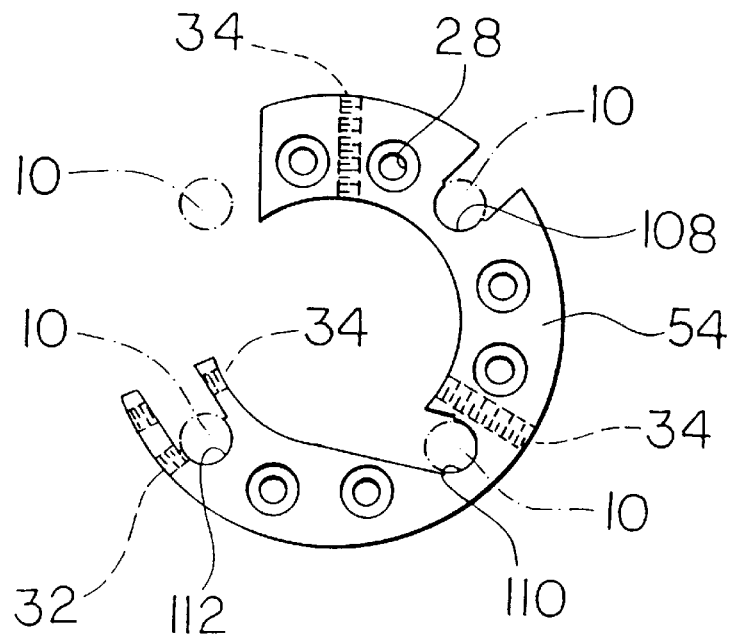
FIG. 6 is a plan view in cross section of a specially modified optical mounting plate.

In FIG. 6 there is depicted a mount 54 which can be easily inserted or removed from a four-rod system as further illustrated in FIG. 12. To insert mount 54 as shown, a rod 10 is introduced into first insertable opening 108 of optical mount 54 and the mount is turned clockwise until second insertable opening 110 of optical mount 54 and third insertable opening 112 of optical mount 54 sit on the other two rods. Mount 54 is then locked into position by means of a set screw in threaded bore 32 in the vicinity of third insertable opening 112.

Figure 7:
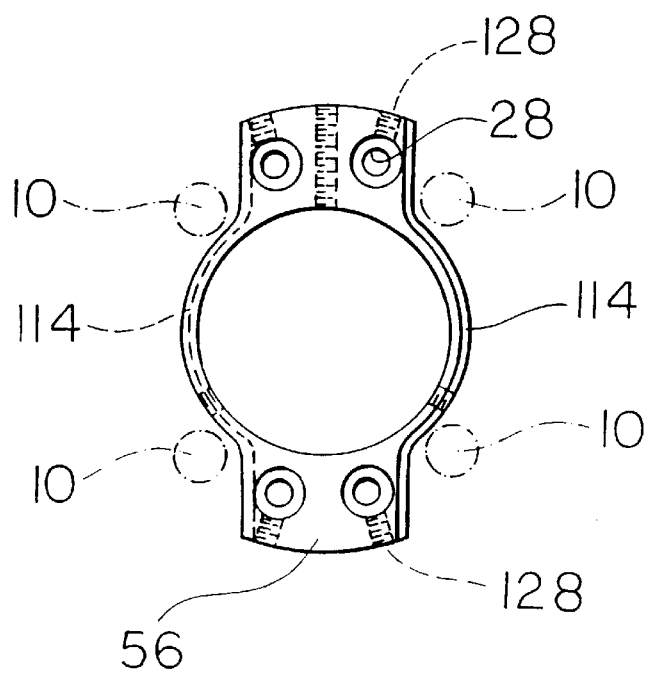
FIG. 7 is a plan view in cross section of another specially modified optical mounting plate.

An optical mount denoted by numeral 56 is shown in FIG. 7. A major portion of the differential radial material has been removed from the mount leaving two opposed portions and a thin ring-like portion containing the inner radial dimension. Mount 56 can be inserted into an assembled set utilizing four rods 10 as shown in FIG. 12. Mount 56 has beveled edges 114 that facilitate its assembly into a four-rod system. FIG. 12 shows mount 56 supported by thin rods 118 and locked into position by means of set screws in threaded bores 128. FIG. 17 shows mount 56 types used with corner connectors 16 and screws 18 in the construction of partial optical cubes while FIG. 13 shows mount 56 with corner connector 16 used in another construction scheme.

Figure 13:
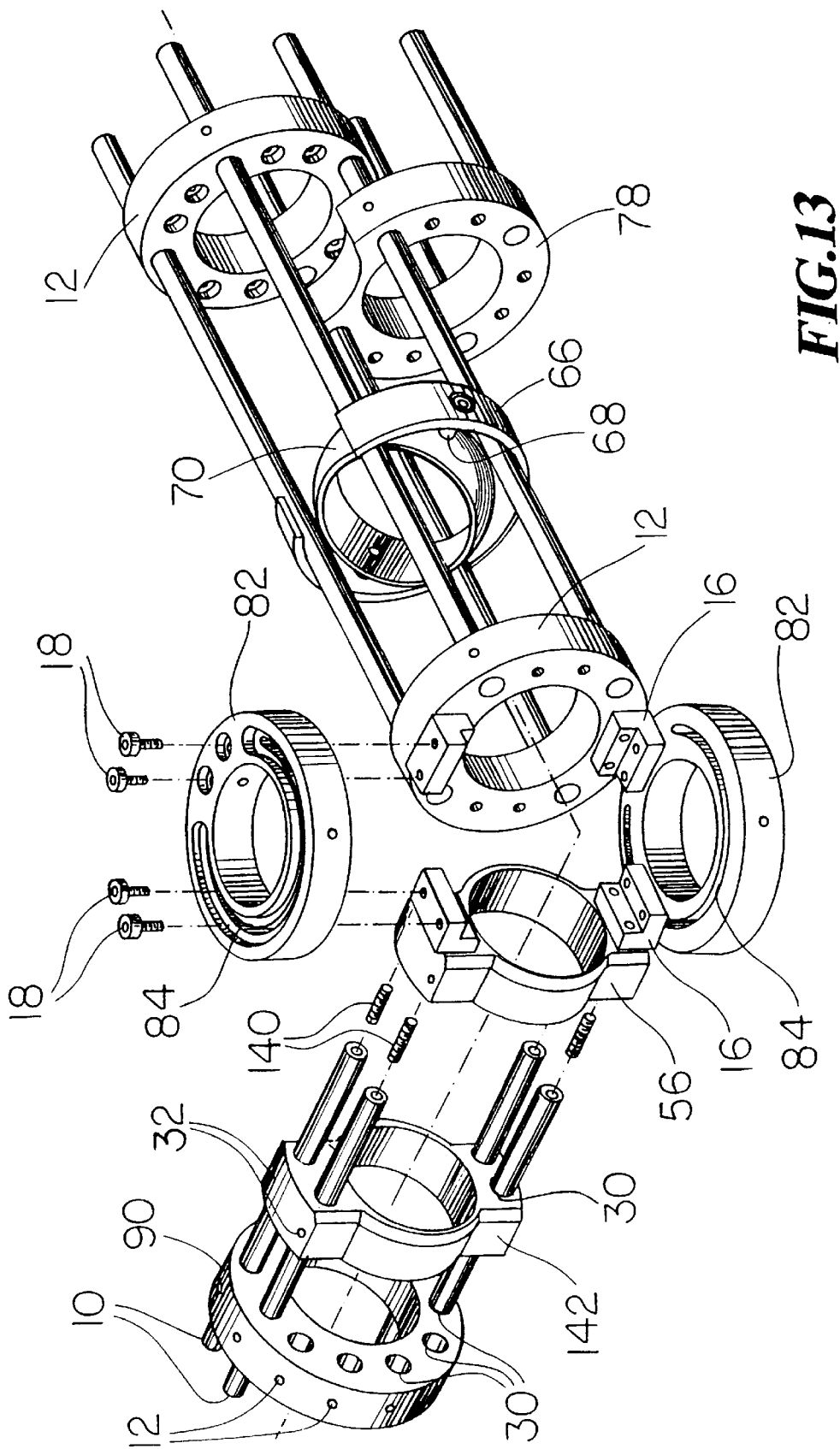
FIG. 13 is a perspective much like FIG. 12 also showing the assembly of various optical mounting plates.

A modification of mount 56 denoted by the numeral 142 is shown in FIG. 13. Mount 142 has four rod accepting apertures 30 which accept the pass-through of rods 10 with provision for securing at any point along said rods by means of set screws at 32. Optical mounting plate 56 may then be secured to the ends of the rods 10 by means of long set screws 140 through corner connector 16.

Figure 8:
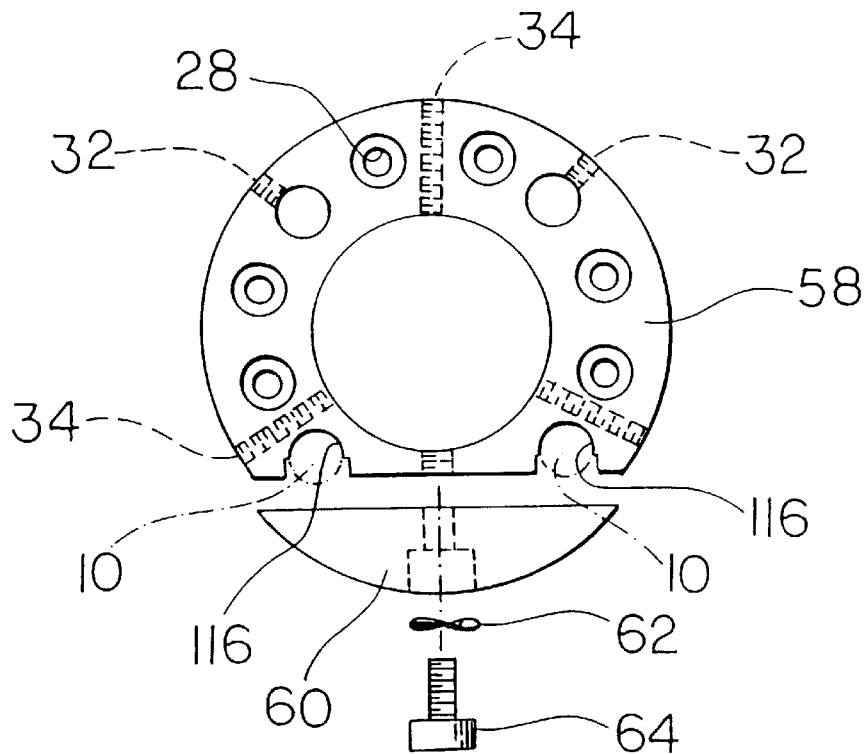
FIG. 8 is an exploded plan view in cross section of a specially modified optical mounting plate showing a securing means.

FIG. 8 depicts an optical mounting plate denoted by the numeral 58. Mount 58 also possesses the facility of being insertable into a two-rod system. FIG. 12 shows a typical construction with mount 58's insertable openings 116 directly engaging rods 10. Locking plate 60, shown in cross section in FIG. 8 as a segment of the circle, may then be employed to secure the mount 58 by means of locking plate securing screw 64 through flex washer 62 into the threads so provided. The flex washer 62 allows the plate 58 to rotate around the screw 64 thus allowing its insertion into the assembly as shown in FIG. 12. Locking plate 60 is then rotated until it is in line with mount 58.

Figure 9:
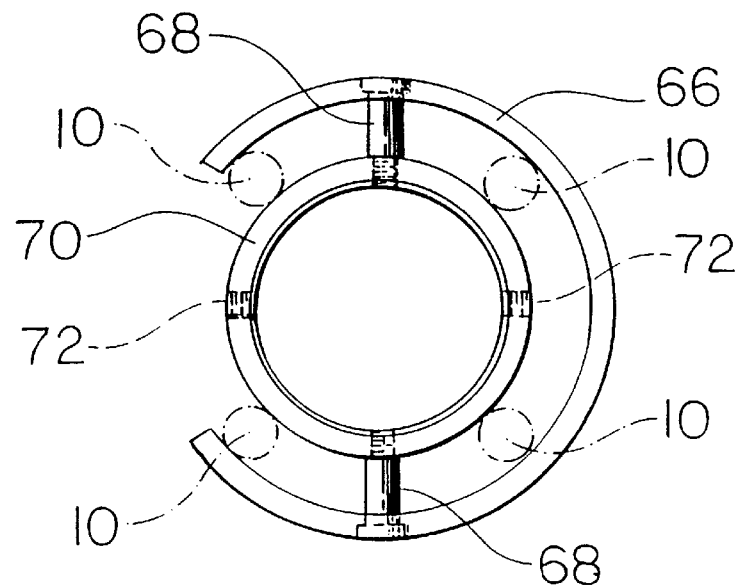
FIG. 9 is a plan view of a specially modified optical mounting plate in accordance with the invention.

FIG. 9 shows details of an optical mounting plate 66 having incorporated within its incomplete annular outer member, a tilting lens mount 70. FIG. 13 illustrates a typical assembly of mount 66 into a construction scheme. The lens mount 70 is spherical on its exterior surface and cylindrical interiorly, said cylindrical interior surface being adapted to hold optical elements. Mount 70 is secured by two securing screws 68, located 180 degrees apart. Rods 10 pass tangent to mount 70 at the outside and to mount 66 on the inside as shown in FIGS. 9 and 13. Optical elements are intended to be secured by means of set screws at threaded bores 72. Lens mount 70 can be tilted around the axis passing through the two screws 68 (FIG. 13) while its spherical outside surface remains in contact with rods 10 at four points. The entire tilting lens assembly can also be rotated about the center of an optical axis parallel with rods 10 and passing through the center of mounts 12.

Figure 10:
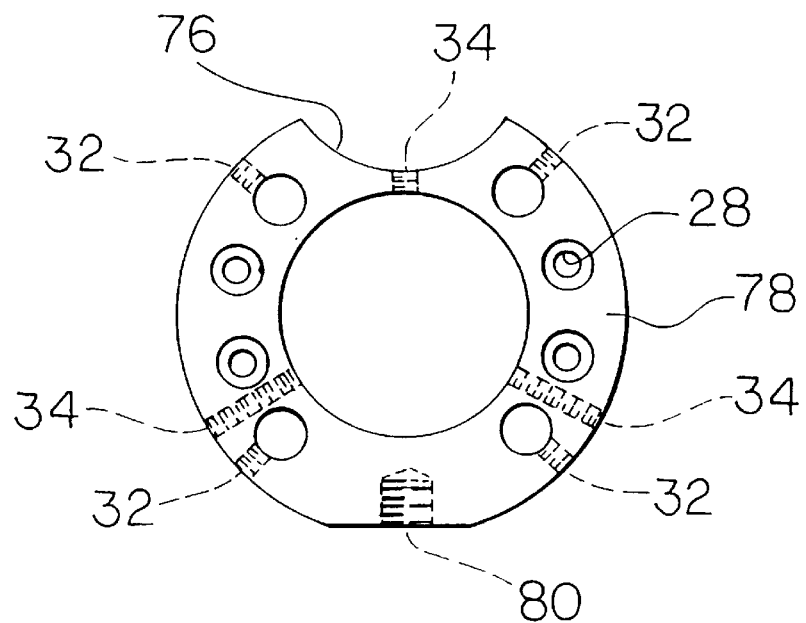
FIG. 10 is a plan view in cross section of a specially modified optical mounting plate in accordance with the invention.

FIG. 10 shows an optical mounting plate denoted by the numeral 78. Mount 78 can be assembled outside of the optical path in a given construction scheme. A cutout portion 76 has been removed from the generally circular cross section to eliminate obstruction of the light path as shown in FIG. 13. The side of the mount 78 opposite to the cutout portion 76 has a threaded bore that allows it to be supported by mounting devices such as vertical posts and like devices as used in optical benches.

Figure 11:
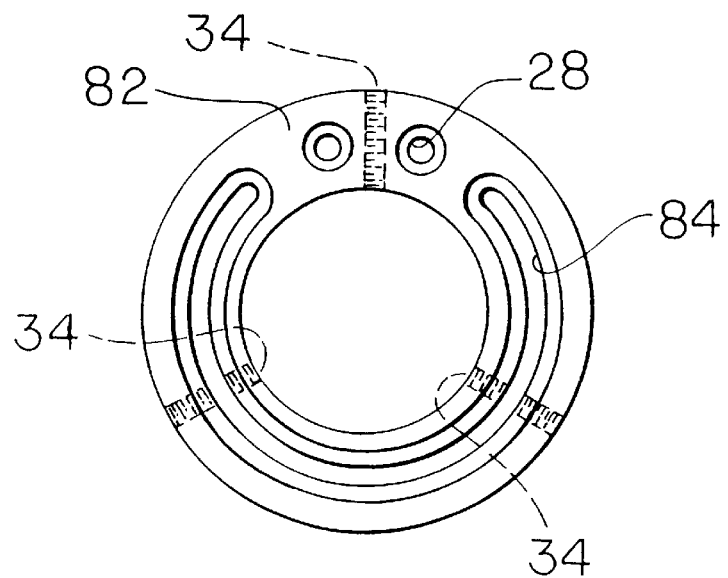
FIG. 11 is a plan view in cross section of a specially modified optical mounting plate showing means for continuous angular adjustment.

FIG. 11 shows an optical mounting plate which is somewhat similar to the second mount 14 of FIG. 3 but modified in that ten of its twelve holes have been joined together so as to form incomplete annular aperture 84 thus to permit continuous change of angle in the optical axis as further shown in FIG. 13. The optical axis of mount 56 can be positioned at any point along the annular path provided by annular aperture 84. Because of its small dimension, mount 56 can be positioned at angles less than ninety degrees to the optical axis of the mount 12. Mount 82 is shown as connected to corner connector 16 by means of screws 18.

FIG. 14 shows an optical mounting plate 86 intended to be used with a modified type of corner connector. Mount 86 is intended to be used with corner connector 42 (FIG. 16) for the purpose of joining two optical cubes together as illustrated in FIG. 17. FIG. 15 shows detail of the corner connector 16.

FIG. 17 shows an optical cube and use of cover plate 88 to light seal the cube. The cover plate may be constructed of opaque plastic and may be secured by snap-in press fit. The components making up the optical cube illustrated in FIG. 17 have been described supra.

Also as has been described supra, FIGS. 18 and 19 show detail views of a corner connector 130 having threaded bores 134 radially spaced and with threaded bores 36 adapted to register with counter bores 28 of optical mounting plates.

Because the threaded bores are positioned with the same radius as in all mounting plates in a set, connector 130 may be utilized similarly to connector 16, employing only threaded bores 36. Alternatively, connector 130 can be used to rotate the optical axis of a perpendicularly mounted optical plate by forty-five degrees as shown in FIG. 21.

Mount 132 allows the entire optical axis to be rotated as illustrated in FIG. 21. Mount 132 presents a modification of mount 12 in which counter bored apertures 28 are joined together in circular arcs 136 so as to allow axial adjustment of the plate. Rods shown to the right of mount 132 are held by mount 86 and these two mounts are shown as held together by four screws through openings 136. By loosening these four screws in mount 132, mount 86 can rotate thirty degrees and can be secured at any position therebetween.

Figure 22:
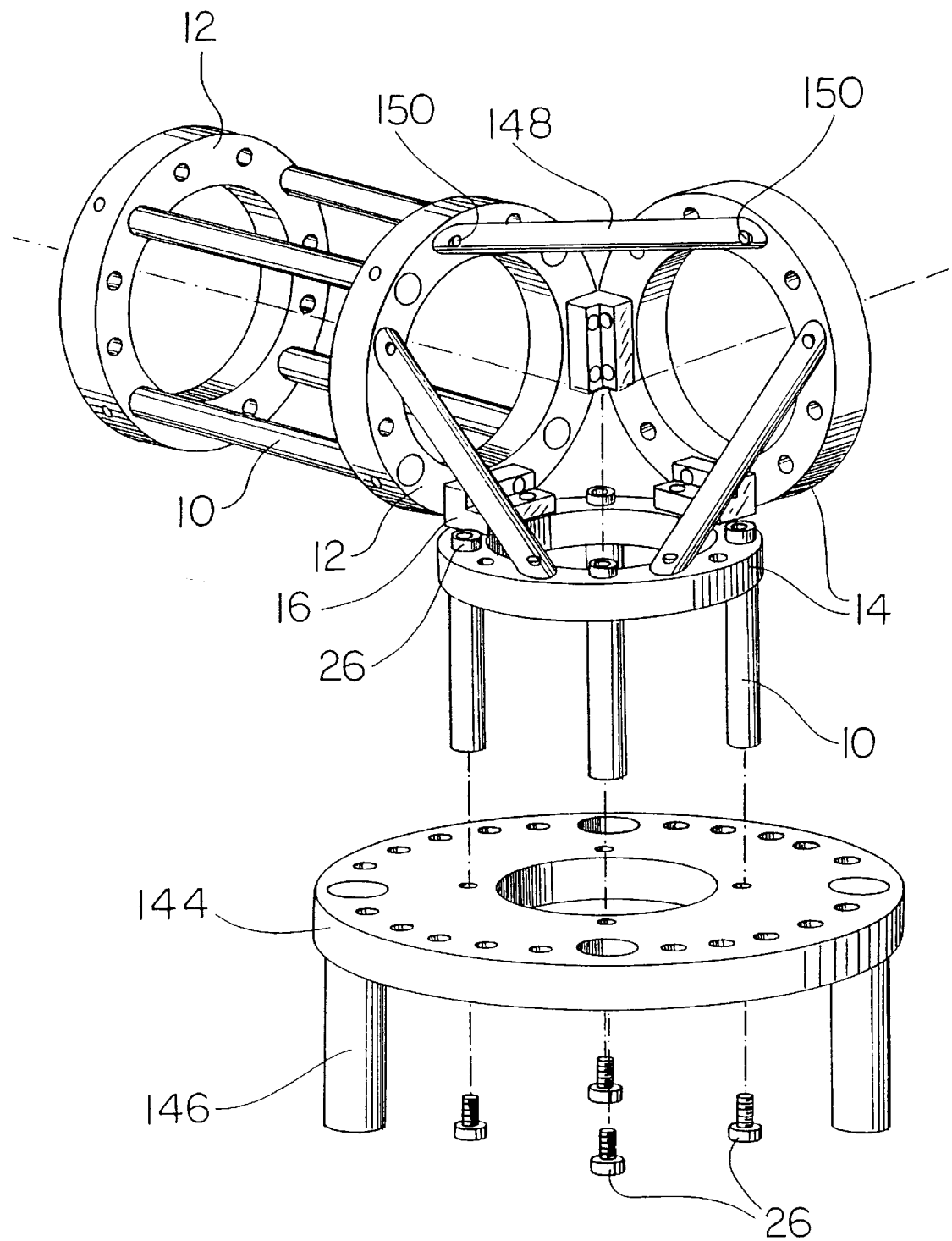
FIG. 22 is a perspective view showing how two different sizes of optical construction plates may be joined together and also showing the use of support rods to construct a half cube.

FIG. 22 illustrates the facility of joining different sized sets of optical construction plates by means of an intermediate mount 144 and screws 26. The ends of rods 148 have been cut at forty-five degree angles and have threaded bores 150. Plate retaining rods 146 apply to a larger optical mounting plate set.

Figure 23:
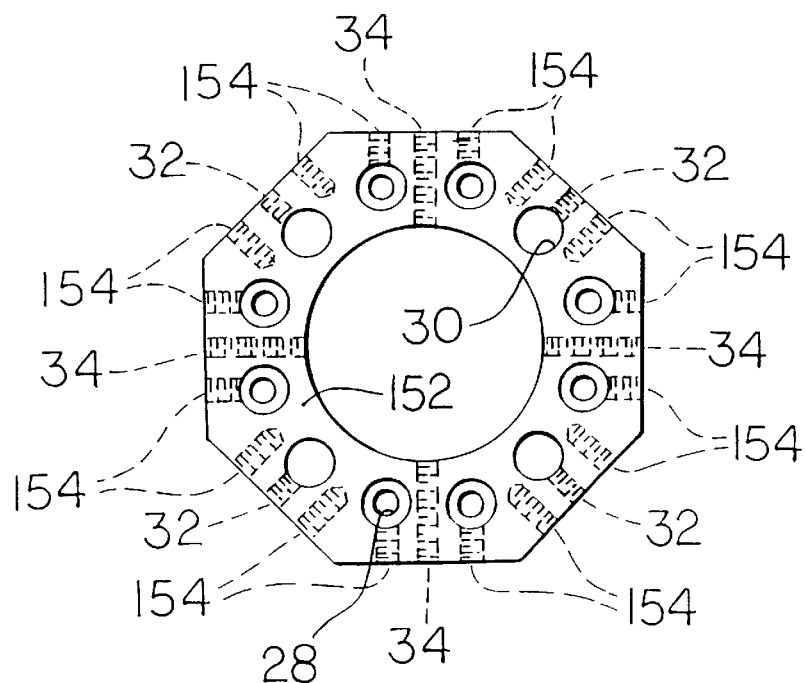
FIG. 23 is a plan view in cross section of a polygonal optical mounting plate such that an inscribed circle will have the same circumference as the optical mounting plates having circular cross section as depicted heretofore.
Figure 24:
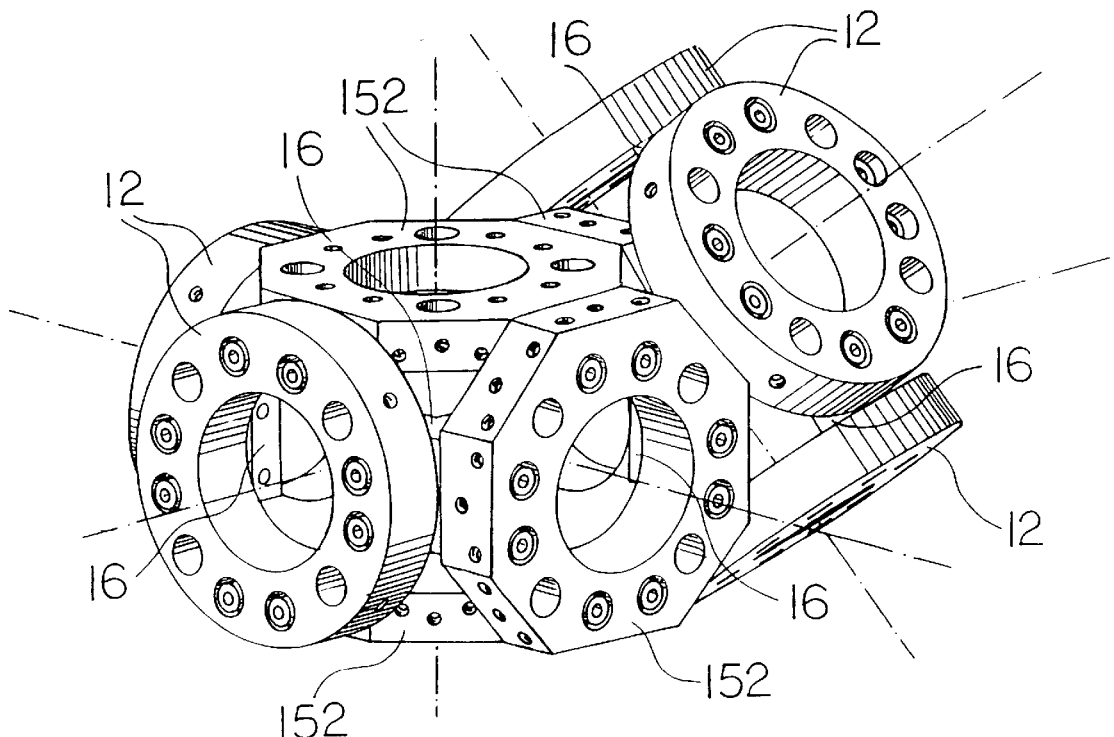

FIG. 23 presents an optical mounting plate 152 having a polygonal outer shape, however, an inscribed circle therein has the same diameter dimension as the priorly described optical mounting plates. Tapped bores 154 are utilized in the arrangement shown in FIG. 24 showing the connection of two or more optical cubes. Mount 152 simplifies the making of optical cubes that would otherwise require the use of a large number of corner connectors. The sides of mount 152 have tapped bores 154 which have the same spacing as the bores in the corner connectors, therefore, allowing the mount to be fastened directly to any other mount in a set. In FIG. 24 mount 152 is further shown as being used to connect two or more cubes in a similar arrangement as with mount 86 in FIG. 17. Mount 152 is shown as directly fastened to mounts 12 of the rear cube and is secured to the front cube by the use of four corner connectors 16. Since the angle between all adjacent sides of mount 152 is one hundred and thirty five degrees, this mount can be used to rotate the optical axis in forty-five degree increments which adjustment is not possible by other mounts with the exception of mount 82, FIG. 11. With the use of mounts 152 and 86, adjacent cubes can be fastened at angles of thirty degree increments with mount 86 and thirty and forty-five degree increments with mount 152.

INDUSTRIAL APPLICABILITY

In particular, the system may be used in the teaching of optics at any level of sophistication in addition to its applications in constructing prototypical and experimental optical instruments and measuring devices.

I claim:

1. An optical bench set, comprising:
   at least one truncated circular cylindrical optical mounting plate having an outer radius and having a concentric central bore therethrough defining an inner radius of such dimension as to admit the installation of optical elements therein;
   said mounting plate having a thickness dimension such that threaded bores may be incorporated in a radial direction therein;
   a plurality of radially directed threaded bores in said mounting plate;
   said mounting plate further having a differential radial dimension so as to permit the fabrication of apertures in an axial direction;
   a plurality of axially directed apertures in said mounting plate;
   corner connectors having threaded bores and adapted to connect a plurality of mounting plates to one another; and
   a plurality of plate retaining rods wherein each of said rods is adapted to pass through an axially directed aperture in said mounting plate.

2. The optical mounting plate of claim 1 including:
   spaced enlarged apertures adapted to isolate the mounting plate from the plate retaining rods;
   spaced apertures dimensioned so as to admit ball-bearing guides to be secured therethrough; and
   means to secure said ball-bearing guides in said spaced apertures.

3. The optical mounting plate of claim 1 having a portion cut out from its circumference so as to form a gap therein;
   a portion cut out from within said differential radial dimension so as to form a first insertable opening;
   another portion cut out from within said differential radial dimension so as to form a second insertable opening; and
   means for locking said mounting plate into position.

4. The optical mounting plate of claim 1 having a portion cut out from its circumference so as to form a gap therein;
   a portion cut out from within said differential radial dimension so as to form a first insertable opening;
   another portion cut out from within said differential radial dimension so as to form a second insertable opening;
   yet another portion cut out from within said differential radial dimension so as to form a third insertable opening; and
   means for locking said mounting plate into position.

5. The optical mounting plate of claim 1 wherein a major portion of the differential radial material has been removed so as to leave remaining two opposed portions;
   beveled edges about the edges of said mounting plate; and
   means for locking said mounting plate into position.

6. The optical mounting plate of claim 5 having four rod accepting apertures with means to secure the position of said mounting plate at any point along said rods.

7. An optical mounting plate as in claim 1 having:
   a portion cut out from said differential radial dimension so as to eliminate obstruction of a light path and having a radially threaded bore in the portion remaining in said plate; and
   a threaded bore opposite said cut out portion.

8. The optical mounting plate of claim 1 wherein an aperture fabricated in an axial direction is an incomplete annular aperture.

9. An optical mounting plate as in claim 1 having threaded axial apertures and adapted to be combined with said corner connectors.

10. A corner connector as in claim 1 having threaded bores spaced about a radial dimension.

11. The optical mounting plate of claim 1 having apertures in the form of circular arcs.

12. The optical mounting plate of claim 1 having a polygonal circumscribing periphery about said outer radius and having tapped bores.

13. An optical mounting plate having an incomplete outer annular member; and
    a tilting lens mount secured to said outer annular member by means of securing screws, said lens mount having a spherical exterior surface and a cylindrical interior surface adapted to receive optical elements.

14. An optical bench system, comprising:
    at least one generally truncated circular cylindrical optical mounting plate having a central bore therethrough for mounting an optical element therein;
    corner connector means for connecting together two or more of said optical mounting plates;
    said optical mounting plates having a radial thickness dimension with bores in an axial direction therein;
    said optical mounting plates having an axial thickness dimension with threaded radial bores therethrough; and
    screws adapted to be accepted in said threaded radial bores for fastening said optical mounting plates to said corner connector means.

15. An optical bench system, comprising:
    at least one generally truncated circular cylindrical optical mounting plate having a central bore therethrough for mounting an optical element therein;
    corner connector means for connecting together two or more of said optical mounting plates;
    said optical mounting plates having a radial thickness dimension with bores in an axial direction joined so as to form an annular aperture therein;

said optical mounting plates having an axial thickness dimension with threaded radial bores therethrough; and screws adapted to be accepted in said threaded radial bores for fastening said optical mounting plates to said corner connector means.

16. An optical bench system, comprising:

at least one generally truncated circular cylindrical optical mounting plate having a central bore therethrough for mounting an optical element therein;

said optical mounting plate having a portion cut out from its circumference so as to form a gap therein; and said optical mounting plate having a radial thickness dimension with first and second insertable openings cut out from within said radial thickness dimension.

17. An optical bench system, comprising:

at least one generally truncated circular cylindrical optical mounting plate having a central bore therethrough for mounting an optical element therein;

said optical mounting plate having a portion cut out from its circumference so as to form a gap therein; and said mounting plate having a radial thickness dimension with first, second and third insertable openings cut out from within said radial thickness dimension.

18. An optical bench system, comprising:

at least one generally truncated circular cylindrical optical mounting plate having a central bore therethrough for mounting an optical element therein;

said optical mounting plate having a portion cut out from its circumference so as to form a gap therein;

said mounting plate having a differential radial dimension so as to permit the fabrication of apertures in an axial direction therein;

a plurality of axial apertures in said plate;

at least one plate retaining rod adapted to pass through an aperture; and a locking plate adapted to mate with said cut out portion to secure said mounting plate to said at least one retaining rod.

19. An optical bench system, comprising:

at least one generally truncated circular cylindrical optical mounting plate having a central bore therethrough for mounting an optical element therein;

said mounting plate having a radial thickness dimension with portions thereof cut away so as to leave two opposed portions; and beveled edges about said mounting plate.

20. An optical bench set, comprising:

at least one truncated circular cylindrical optical mounting plate having an outer radius and having a concentric central bore therethrough defining an inner radius of such dimension as to admit the installation of optical elements therein;

said mounting plate having a thickness dimension such that threaded bores may be incorporated in a radial direction therein;

a plurality of radially directed threaded bores in said mounting plate;

said mounting plate further having a differential radial dimension so as to permit the fabrication of apertures in an axial direction;

a plurality of counterbored, axially directed apertures in said mounting plate;

corner connectors having threaded bores and adapted to connect a plurality of mounting plates to one another;

a first plurality of fastening screws adapted to secure said corner connectors and said mounting plates to one another;

a plurality of plate retaining rods threaded at the ends thereof wherein each of said rods is adapted to secure a counterbored axially directed aperture in said mounting plate; and a second plurality of fastening screws adapted to secure each of said plate retaining rods to one of said counterbored axially directed apertures in said mounting plate.

21. An optical bench set, comprising:

at least one truncated circular cylindrical optical mounting plate having an outer radius and having a concentric central bore therethrough defining an inner radius of such dimension as to admit the installation of optical elements therein;

said mounting plate having a thickness dimension such that threaded bores may be incorporated in a radial direction therein;

a plurality of radially directed threaded bores in said mounting plate;

said mounting plate further having a differential radial dimension so as to permit the fabrication of apertures in an axial direction;

a plurality of axially directed apertures in said mounting plate;

corner connectors having threaded bores and adapted to connect a plurality of mounting plates to one another;

a plurality of plate retaining rods wherein each of said rods is adapted to pass through an axially directed aperture in said mounting plate;

a locking plate formed from a segment of said mounting plate, said locking plate having a bore through which may be inserted a locking plate securing screw threadable into threads provided in the mounting plate;

a flex washer through which said locking plate securing screw is adapted to be inserted so as to permit rotation of said locking plate about said locking plate securing screw; and a pair of insertable openings in said mounting plate adapted to accept a plate retaining rod in each of said insertable openings therethrough.

* * * * *